United States Patent
Ezrielev et al.

(10) Patent No.: US 11,848,987 B2
(45) Date of Patent: Dec. 19, 2023

(54) SHARDED DATABASE LEADER REPLICA DISTRIBUTOR

(71) Applicant: Dell Products, L.P., Round Rock, TX (US)

(72) Inventors: Ofir Ezrielev, Be'er Sheva (IL); Nadav Azaria, Be'er Sheva (IL); Yonit Weiss, Lehavim (IL)

(73) Assignee: DELL PRODUCTS, L.P., Round Rock, TX (US)

( * ) Notice: Subject to any disclaimer, the term of this patent is extended or adjusted under 35 U.S.C. 154(b) by 173 days.

(21) Appl. No.: 17/508,529

(22) Filed: Oct. 22, 2021

(65) Prior Publication Data

US 2023/0131029 A1    Apr. 27, 2023

(51) Int. Cl.
*G06F 16/00*    (2019.01)
*H04L 67/104*   (2022.01)
*G06F 16/28*    (2019.01)
*H04L 67/1023*  (2022.01)

(52) U.S. Cl.
CPC ........ *H04L 67/1059* (2013.01); *G06F 16/285* (2019.01); *H04L 67/1023* (2013.01); *H04L 67/1051* (2013.01)

(58) Field of Classification Search
CPC ............................ H04L 67/1059; G06F 16/285
USPC .......................................................... 707/737
See application file for complete search history.

(56) References Cited

U.S. PATENT DOCUMENTS

| | | | |
|---|---|---|---|
| 2020/0242104 A1* | 7/2020 | Persson | G06F 16/2379 707/707 |
| 2021/0089504 A1* | 3/2021 | Liu | G06F 16/278 707/707 |
| 2021/0303633 A1* | 9/2021 | Irazabal | H04L 9/0643 707/707 |
| 2021/0344749 A1* | 11/2021 | Karlsson | H04L 67/1012 707/707 |
| 2022/0309045 A1* | 9/2022 | Lambert | G06F 16/219 707/707 |
| 2022/0414100 A1* | 12/2022 | Carter | G06F 16/2471 707/707 |
| 2023/0009909 A1* | 1/2023 | Porter | G06F 16/285 707/707 |
| 2023/0019637 A1* | 1/2023 | Sadoghi Hamedani | H04L 9/3236 707/707 |

(Continued)

*Primary Examiner* — Alexandria Y Bromell
(74) *Attorney, Agent, or Firm* — Amin, Turocy & Watson, LLP

(57) ABSTRACT

A system can a divide database into a group of shards distributed among a group of data centers, wherein the group of shards comprises respective leader replicas. The system can determine respective correlation values between pairs of shards of the group of shards. The system can examine the pairs of shards in a descending order of respective correlation values, comprising, in response to determining that a respective pair of shards of the pairs of shards has a first correlation value greater than a predetermined threshold value, and that at least one shard of the respective pair of shards is unlocked, reassigning leader replicas of the respective pair of shards to be stored in a same data center of the group of data centers, and locking the leader replicas of the respective pair of shards from being reassigned to another data center of the group of data centers during the examining.

20 Claims, 12 Drawing Sheets

(56) References Cited

U.S. PATENT DOCUMENTS

2023/0124867 A1* 4/2023 Han .................. G06F 16/2255
707/830
2023/0128877 A1 4/2023 Ezrielev et al.

* cited by examiner

900

(902)

↓

DIVIDING A DATABASE INTO A GROUP OF SHARDS THAT ARE DISTRIBUTED AMONG A GROUP OF DATA CENTERS, WHEREIN THE GROUP OF SHARDS COMPRISES RESPECTIVE LEADER REPLICAS 904

↓

DETERMINING RESPECTIVE CORRELATION VALUES BETWEEN PAIRS OF SHARDS OF THE GROUP OF SHARDS 906

↓

EXAMINING THE PAIRS OF SHARDS IN A DESCENDING ORDER OF RESPECTIVE CORRELATION VALUES 908

IN RESPONSE TO DETERMINING THAT A RESPECTIVE PAIR OF SHARDS OF THE PAIRS OF SHARDS HAS A FIRST CORRELATION VALUE THAT IS GREATER THAN A PREDETERMINED THRESHOLD VALUE, AND THAT AT LEAST ONE SHARD OF THE RESPECTIVE PAIR OF SHARDS IS UNLOCKED, REASSIGNING LEADER REPLICAS OF THE RESPECTIVE PAIR OF SHARDS TO BE STORED IN A SAME DATA CENTER OF THE GROUP OF DATA CENTERS 910

LOCKING THE LEADER REPLICAS OF THE RESPECTIVE PAIR OF SHARDS FROM BEING REASSIGNED TO ANOTHER DATA CENTER OF THE GROUP OF DATA CENTERS DURING THE EXAMINING 912

SHARDED DATABASE LEADER REPLICA DISTRIBUTOR

BACKGROUND

A database can be spread across multiple computers by dividing a database into shards. Shards can be stored across multiple physical datacenters.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can divide a database into a group of shards that are distributed among a group of data centers, wherein the group of shards comprises respective leader replicas. The system can determine respective correlation values between pairs of shards of the group of shards. The system can examine the pairs of shards in a descending order of respective correlation values, comprising, in response to determining that a respective pair of shards of the pairs of shards has a first correlation value that is greater than a predetermined threshold value, and that at least one shard of the respective pair of shards is unlocked, reassigning leader replicas of the respective pair of shards to be stored in a same data center of the group of data centers, and locking the leader replicas of the respective pair of shards from being reassigned to another data center of the group of data centers during the examining.

A method can comprise determining, by a system comprising a processor, respective correlation values between pairs of shards that are distributed among a group of data centers. The method can further comprise analyzing, by the system, the pairs of shards, where analyzing comprises, in response to determining that a respective pair of shards of the pairs of shards has a first correlation value that is greater than a predetermined threshold value, and that at least one shard of the respective pair of shards is unlocked, reassigning leader replicas of the respective pair of shards to be stored in a same data center of the group of data centers, and locking leader replicas of the respective pair of shards.

An example non-transitory computer-readable medium can comprise instructions that, in response to execution, cause a system comprising a processor to perform operations. These operations can comprise determining respective correlation values between pairs of shards that are distributed among a group of data centers. These operations can further comprise, in response to determining that a first pair of shards of the pairs of shards has a first correlation value that is greater than a predetermined threshold value, and that at least one shard of the first pair of shards is unlocked, reassigning leader replicas of the first pair of shards to be stored in a same data center of the group of data centers. These operations can further comprise locking leader replicas of the first pair of shards.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 9 illustrates an example process flow a sharded database leader replica distributor, in accordance with an embodiment of this disclosure;

DETAILED DESCRIPTION

Overview

Figure 1:
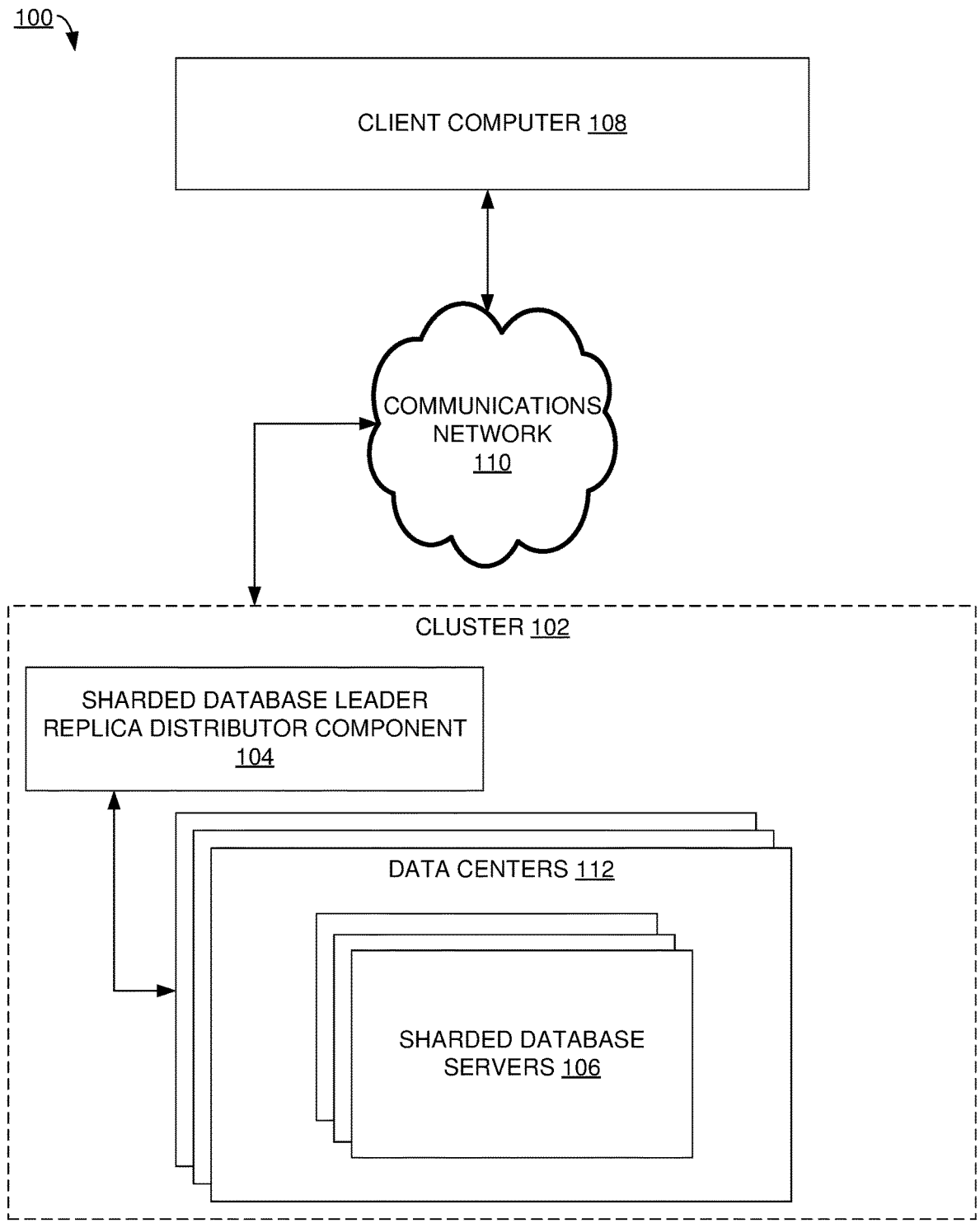
FIG. 1 illustrates an example system architecture that can facilitate a sharded database leader replica distributor, in accordance with an embodiment of this disclosure.

In some examples, applications can be deployed on multiple datacenters that are located in multiple zones. It can be that a latency of transmitting data between datacenters can be greater than a latency of transmitting data within a datacenter. An approach to minimize latency can be to implement geolocation awareness, where application services attempt to communicate within the datacenter in which they reside. It can be challenging to implement geolocation awareness, because some services can require that all communications with a service travel through a single endpoint.

Forcing all communications with a service travel through a single endpoint can cause inter-datacenter communication, which can induce increased latency and security risks relative to intra-datacenter communication.

The present techniques can be implemented to mitigate against a problem of inter-datacenter communications by providing a leader replica distributor (which can be distinguished from a load balancer), which can allocate leader replicas (sometimes referred to as leader shards) among data centers to reduce, or minimize, inter-data center communications associated with processing a request to the database.

Sharding can comprise an approach of splitting and storing a single logical dataset into multiple databases, which can then be distributed among multiple computers. By distributing the data among multiple computers, a cluster of database systems can store larger datasets and handle additional requests compared to one database system. Sharding can be implemented where a dataset is too large to be stored within a single database. Moreover, sharding strategies can facilitate additional computers being added over time. Sharding can facilitate scaling a database cluster along with its data and traffic growth.

There can exist various approaches to distribute data into multiple databases. Various approaches can have pros and cons based on assumptions made in an approach. For example, cross-partition operations can involve searching through many databases, and generally be inefficient to process. Hotspots can comprise an uneven distribution of data and operations, and can generally counteract benefits associated with sharding.

In some examples, a system can store multiple copies of one shard on different computers of the system. Where there are multiple copies of a shard, one copy can be designated as the leader replica, which processes all writes for the shard (and the writes can then be replicated out to the non-leader copies of the shard).

The present techniques can be applied to reduce an amount of inter-database communication involved with operating a program in a distributed cloud setting. This reduction of inter-database communication can translate to a lower latency in applications running in a distributed cloud.

The present techniques can also be implemented to dynamically distribute leader replicas to minimize inter-datacenter communications in processing a request.

The present techniques can be implemented to provide the following benefits. The present techniques can be implemented to decrease latency in program runs. Resource spending and latency bottlenecks encountered in program runs can be decreased, by reducing a number of inter-datacenter communications.

The present techniques can be implemented to improve system security. Inter-datacenter communications can provide a larger attack surface than intra-datacenter communications. By shifting communications from inter-datacenter to intra-datacenter, security can be improved.

The present techniques can be implemented to provide a dynamic system for leader replicas and requests distribution. That is, access correlation-based leader replicas and load distribution can be provided.

Example Architectures

FIG. 1 illustrates an example system architecture 100 that can facilitate a sharded database leader replica distributor, in accordance with an embodiment of this disclosure. System architecture 100 comprises cluster 102, client computer 108, and communications network 110. In turn, cluster 102 comprises sharded database leader replica distributor component 104, and data centers 112 (which in turn can each comprise an instance of sharded database servers 106).

Figure 12:
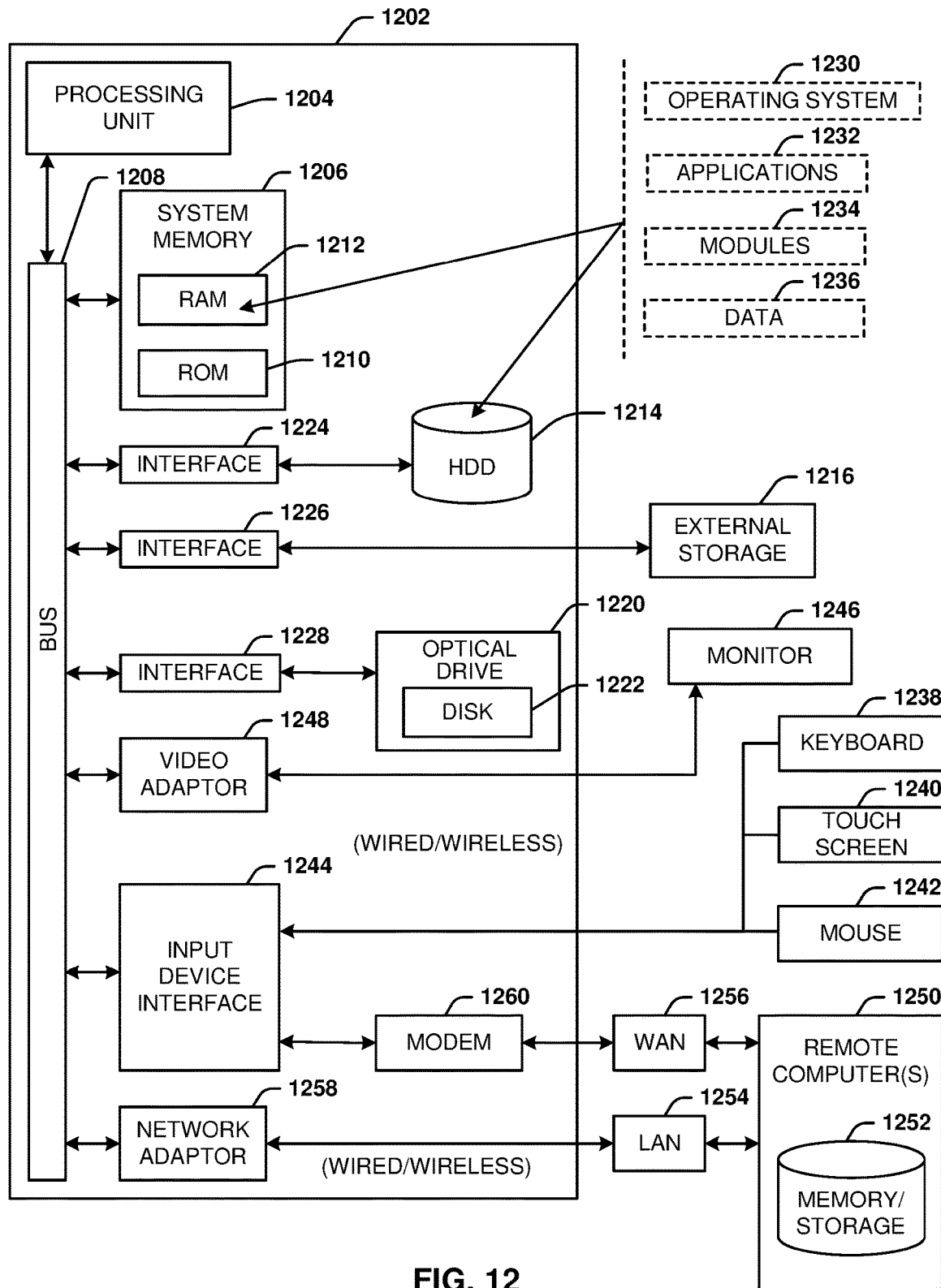
FIG. 12 illustrates an example block diagram of a computer operable to execute an embodiment of this disclosure.

Each of client computer 108, data centers 112, and sharded database servers can be implemented with part(s) of computing environment 1200 of FIG. 12. Communications network 110 can comprise a computer communications network, such as the Internet.

Cluster 102 can maintain a database where sharded database servers of sharded database servers 106 can store database shards. In some examples, different leader replicas of different shards are stored in different data centers of data centers 112 (and on different sharded database servers of sharded database servers 106).

Client computer 108 can make a request to access a sharded database stored on cluster 102. In the course of processing the request, multiple shard leaders can be accessed, some of which are can be in the same data center and some of which can be located in different data centers. Communications between sharded database servers within one data center can be referred to as "intra-data center communications," and communications between sharded database servers spread across multiple data centers can be referred to as "inter-data center communications."

Sharded database leader replica distributor component 104 can assign a location of leader replicas for shards to be in particular data centers to minimize inter-data center communications. In some examples, an approach to minimizing inter-data center communications would be to assign all leader replicas to one data center. However, this approach might overload that one data center while underloading other data centers. So, sharded database leader replica distributor component 104 can assign a location of leader replicas for shards to be in particular data centers to minimize inter-data center communications in a manner that reduces inter-data center communications while also spreading a load across data centers of data centers 112.

In assigning a location to leader replicas, sharded database leader replica distributor component 104 can utilize stored information about access requests to the database. That is, as requests from client computer 108 (or another entity) are made to cluster 102, these requests can be logged (e.g., a time of request, a session identifier, and an identity of what shards on what data centers were used in fulfilling the request). Then, sharded database leader replica distributor component 104 can utilize this logged information in assigning a location to leader replicas.

In effectuating sharded database load distribution, sharded database leader replica distributor component 104 can implement part(s) of the operating procedures of FIGS. 4 and 6-11.

Figure 2:
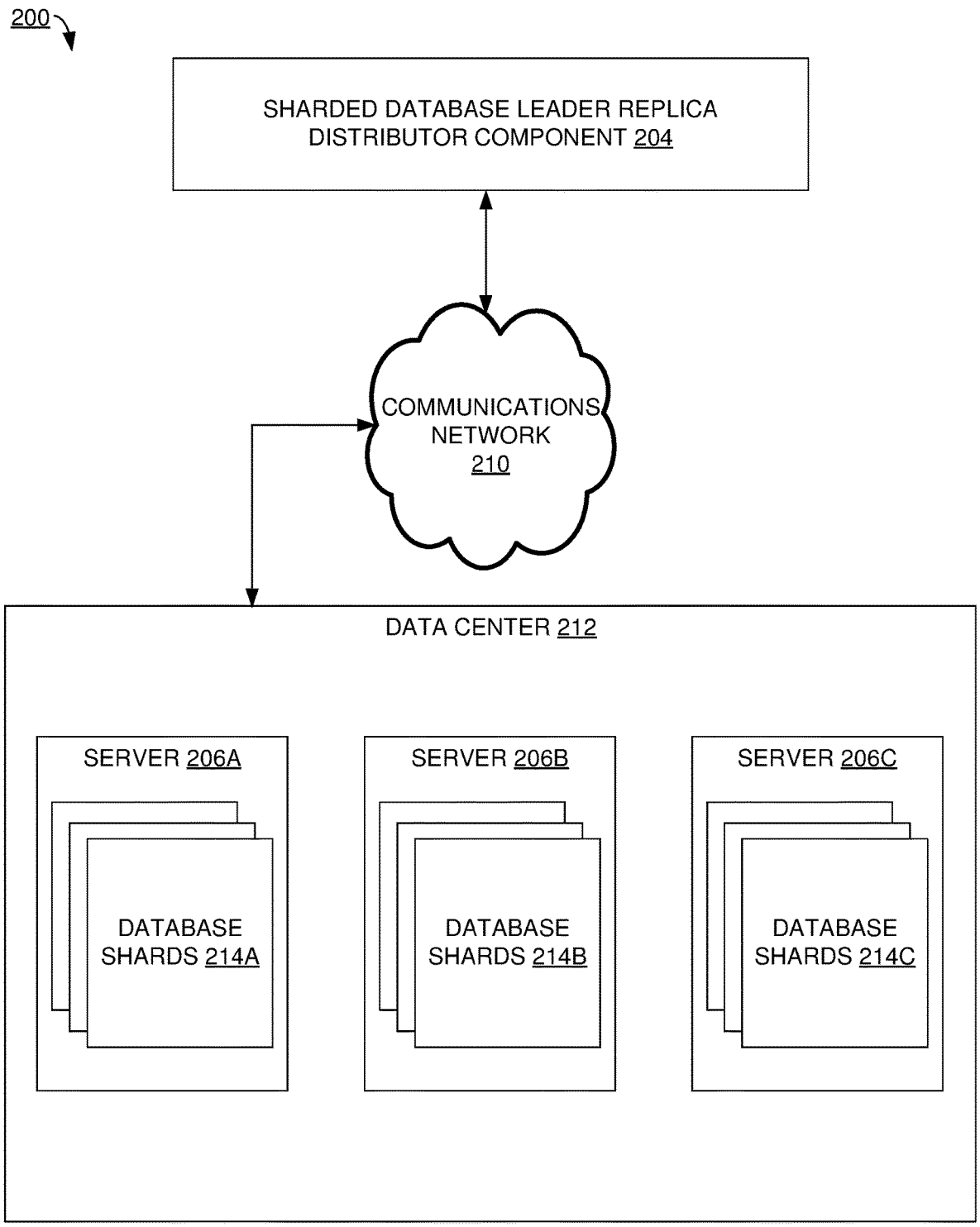
FIG. 2 illustrates another example system architecture that can facilitate a sharded database leader replica distributor, in accordance with an embodiment of this disclosure.

FIG. 2 illustrates another example system architecture 200 that can facilitate a sharded database leader replica distributor, in accordance with an embodiment of this disclosure.

As depicted, system architecture 200 comprises sharded database leader replica distributor component 204 (which can be similar to sharded database leader replica distributor component 104 of FIG. 1), communications network 210 (which can be similar to communications network 110, where communications network 110 is a public network, and communications network 210 is an intranet), and data center 212 (which can be similar to a data center of data centers 112).

Relative to system architecture 100 of FIG. 1, system architecture 200 can present a more detailed view of one data center. Data center 212 comprises multiple servers (server 206A, server 206B, and server 206C).

Each server comprises multiple shards of a sharded database. Server 206A comprises database shards 214A, server 206B comprises database shards 214B, and server 206C comprises database shards 214C.

In processing a request from a client (e.g., client computer 108 of FIG. 1), sharded database leader replica distributor can direct the request to a data center, such as data center 212. Data center 212 can process the request with some shards stored in server 206A, server 206B, and server 206C (which could involve intra-data center communication).

Where data center 212 lacks all shards needed to process the request, data center 212 can communicate with other data centers (e.g., data centers of cluster 102 of FIG. 1) (which can involve inter-data center communication).

Figure 3:
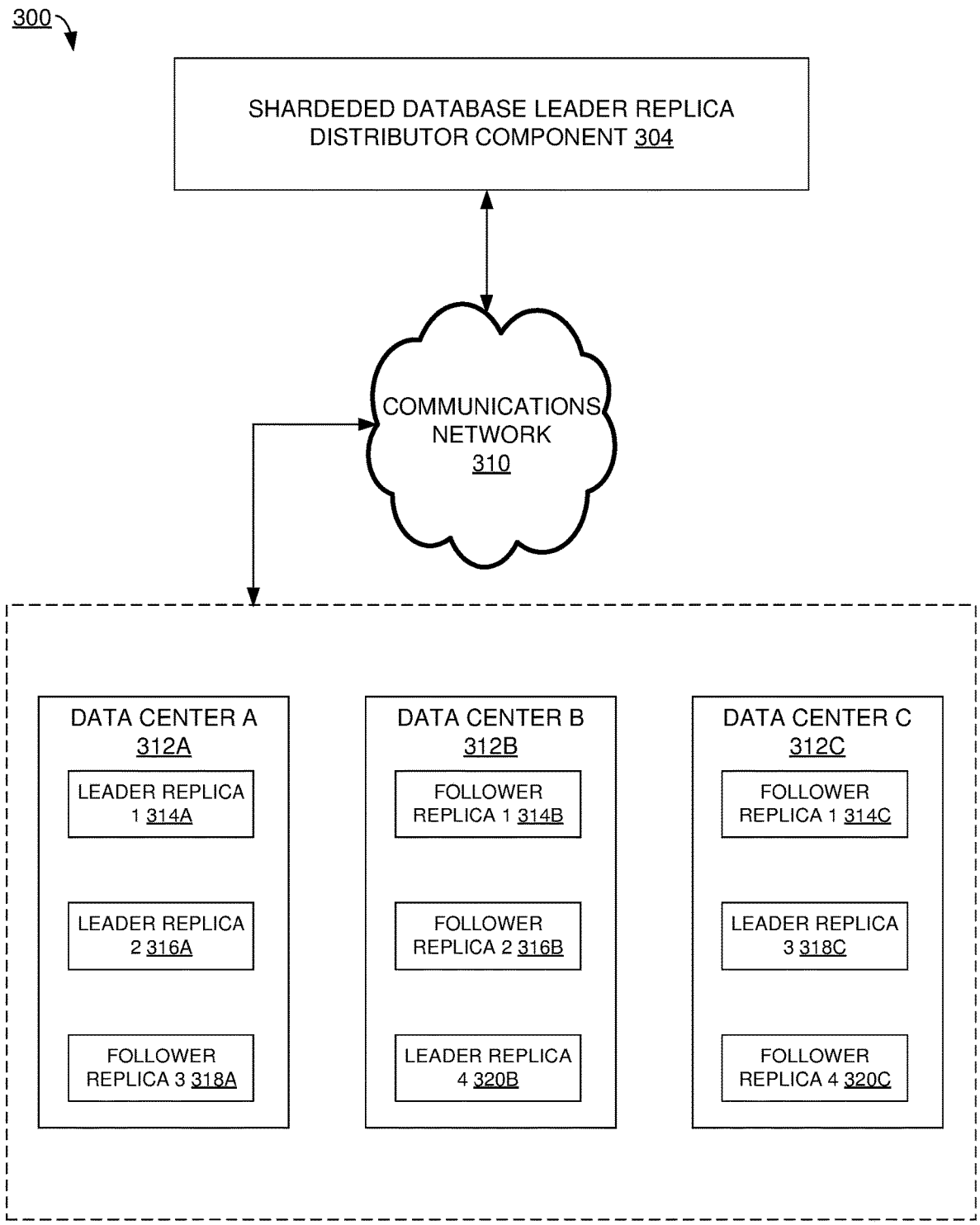
FIG. 3 illustrates another example system architecture that can facilitate a sharded database leader replica distributor, in accordance with an embodiment of this disclosure.

FIG. 3 illustrates another example system architecture 300 that can facilitate a sharded database leader replica distributor, in accordance with an embodiment of this disclosure.

As depicted, system architecture 300 comprises sharded database leader replica distributor component 304 (which can be similar to sharded database leader replica distributor component 104 of FIG. 1), communications network 310 (which can be similar to communications network 110, where communications network 110 is a public network, and communications network 310 is an intranet), and data center 312A, data center 312B, and data center 312C (which can each be similar to a data center of data centers 112).

In some examples, a group of shards that store the same information (e.g., shards that are copies of each other) can be referred to as having a leader replica and one or more follower replicas. Data center A 312A comprises leader replica 1 314A, leader replica 2 316A, and follower replica 3 318A. Data center B 312B comprises follower replica 1 314B, follower replica 2 314B, and leader replica 4 320B. Data center C 312C comprises follower replica 1 314C, leader replica 3 318C, and follower replica 4 320C.

As depicted, system architecture 300 comprises multiple shards, which each have multiple copies stored across data center A 312A, data center B 312B, and data center C 312C. That is, follower replica 1 has copies in the form of leader replica 1 314A (on data center A 312A), follower replica 1 314B (on data center B 312B), and follower replica 1 314C (on data center C 312C). Follower replica 2 has copies in the form of leader replica 2 316A (on data center A 312A), and follower replica 2 316B (on data center B 312B). Follower replica 3 has copies in the form of follower replica 3 318A (on data center A 318A), and leader replica 3 318C (on data center 3 318C). Follower replica 4 has copies in the form of leader replica 4 320B (on data center B 312B) and follower replica 4 320C (on data center 4 320C).

Sharded database leader replica distributor component 304 can periodically redistribute the leader replicas of system architecture 300 to different data centers. This can involve assigning a particular shard to be a leader replica, rather than copying data of the leader replica to another data center. Sharded database leader replica distributor component 304 can perform this periodic redistribution to reduce (or minimize) inter-data center communications. For example, it can be that a request that involves a write to shard 4 also always involves a write to shard 3. In such cases, sharded database leader replica distributor component 304 can reassign leader replicas such that the leader replicas for shard 3 and shard 4 are located on the same data center. Sharded database leader replica distributor component 304 can reassign the leader replica of shard 4 from leader replica 4 320B to follower replica 4 320C to accomplish this.

Example Process Flow

Figure 4:
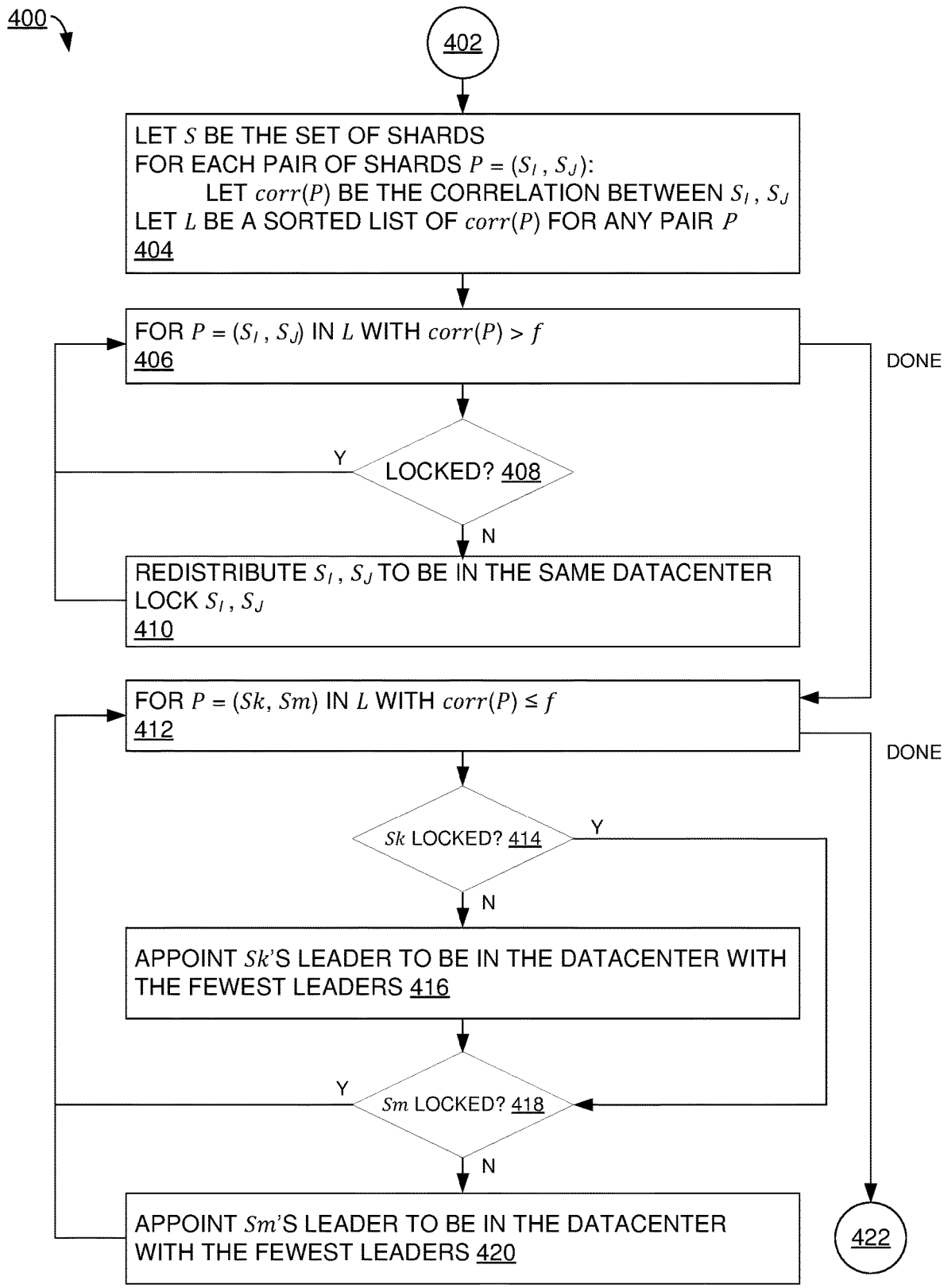
FIG. 4 illustrates an example process flow that can facilitate a sharded database leader replica distributor, in accordance with an embodiment of this disclosure.

FIG. 4 illustrates an example process flow 400 that can facilitate a sharded database leader replica distributor, in accordance with an embodiment of this disclosure. In some examples, one or more embodiments of process flow 400 can be implemented by sharded database leader replica distributor component 104 of FIG. 1, sharded database leader replica distributor component 204 of FIG. 2, sharded database leader replica distributor component 304 of FIG. 3, or computing environment 1200 of FIG. 12.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Redistributing leader replica locations can be implemented as follows. It can be that different requests and a need for different shards will change and fluctuate with time. Thus, leader replicas' locations can periodically be reorganized to minimize inter-datacenter communications. An approach to this can be to, every time delta, a leader replica distribution that would have minimized inter-datacenter communications can be determined, and leaders can be reorganized accordingly. This distribution can put shard leaders in the same datacenter based on a correlation of whether they are both involved in processing a given request, while also keeping shard leaders in multiple datacenters for a degree of load balancing. This approach can be set forth in the following pseudocode:

In some examples, process flow 400 can implement the following pseudocode for a sharded database leader replica distributor:

let S be the set of shards
For each pair of shards $P=(S_i, S_j)$:
let corr(P) be the Pearson correlation between $S_i$, $S_j$
let L be a sorted list of corr(P) for any pair P
for $P=(S_i, S_j)$ in L with corr(P)>f: //f is a filter correlation
   if both $S_i$, $S_j$ are not locked, redistribute $S_i$, $S_j$ to be in the same datacenter lock $S_i$, $S_j$
for $P=(S_k, S_m)$ in L with corr(P)<f:
   if $S_k$ is not locked, appoint its leader to be in the datacenter with the fewest leaders
   if $S_m$ is not locked, appoint its leader to be in the datacenter with the fewest leaders Process flow 400 begins with 402, and moves to operation 404. Operation 404 generally comprises determining a correlation value between each pair of shards (such as shards stored in cluster 102 of FIG. 1), and sorting the pairs in descending order of correlation.

In some examples, the correlation value can represent a Pearson correlation value, which generally can comprise a measure of linear correlation between two shards (e.g., a measure of how both shards are accessed, or written to, to respond to one request). A Pearson correlation can be normalized so that a covariance value ranges between −1 and 1.

Figure 6:
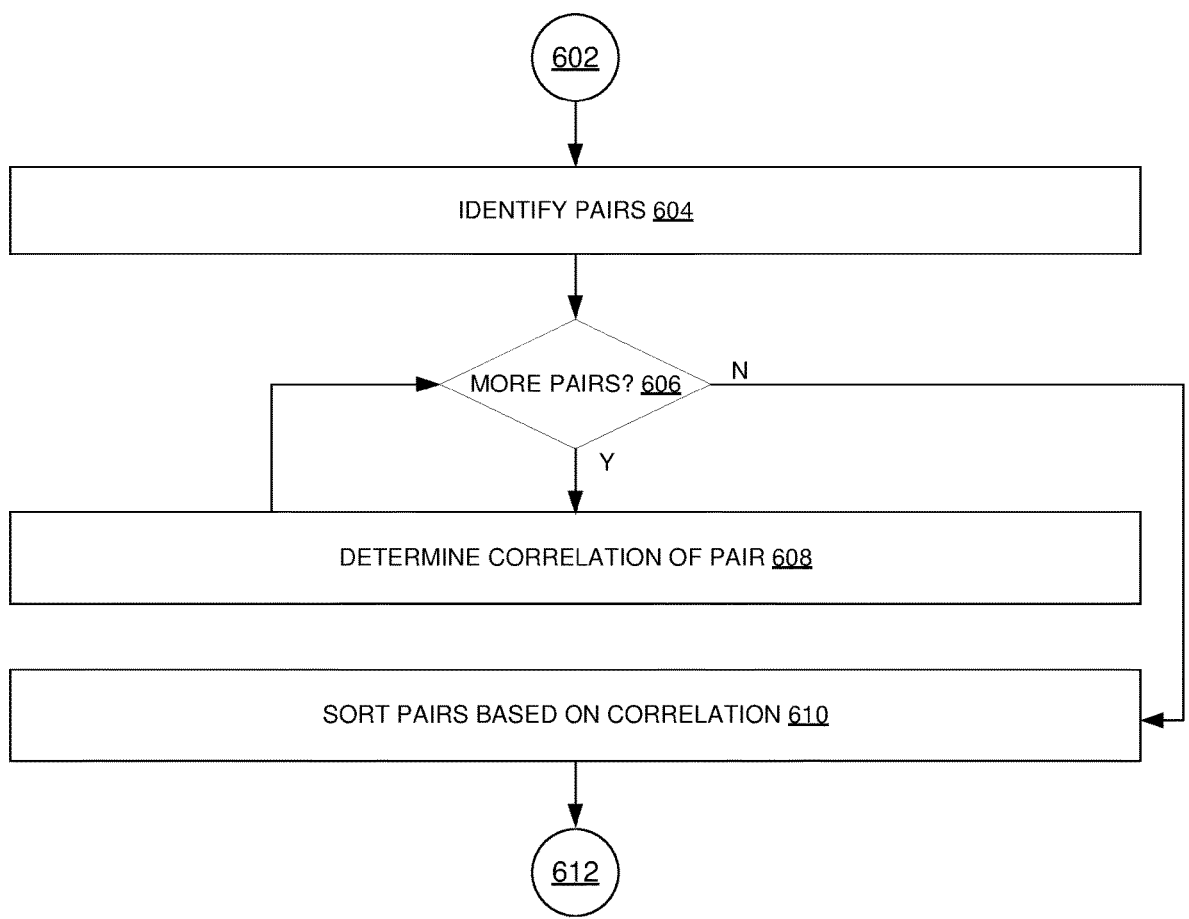
FIG. 6 illustrates an example process flow for sorting shard pairs that can facilitate a sharded database leader replica distributor, in accordance with an embodiment of this disclosure.

In some examples, operation 404 can be implemented in a similar manner as process flow 600 of FIG. 6.

After operation 404, process flow 400 moves to operation 406. Operation 406 generally comprises examining the pairs of shards in descending order of correlation value, for those pairs of shards that have a correlation value above a predetermined threshold value (or equal to or above that value). That is, in some examples, shards in pairs can be processed in two different ways. For those pairs that are sufficiently correlated (e.g., both leader replicas are likely to be used in processing one request), an attempt can be made to redistribute the leader replicas to the same data center. This can occur in operations 406-410.

Then, for those pairs that are less correlated (e.g., their correlation value is below the predetermined threshold value, or less than or equal to that value), leader replicas for shards in those pairs can be assigned to data centers with few leaders, so as to spread load across data centers in cluster. This can occur in operations 412-420.

In operation 406, a pair can be selected that has not yet been examined in this instance of process flow 400, that has a correlation value above the predetermined threshold value, and that has a highest correlation value of those pairs that are yet to be examined (the examination can occur in descending order of correlation value).

Where it is determined in operation 406 that there is another pair that has a correlation value above the predetermined threshold, process flow 400 can move to operation 408. Otherwise, after all pairs that have a correlation value above the predetermined threshold value have been examined as part of operations 406-410, process flow 400 can move from operation 406 to operation 412. Where there is another pair to Operation 408 depicts determining whether the leader shards for the pair are locked. This can comprise determining whether the leader shards for the pair have been locked in this instance of implementing process flow 400, where locking a shard indicates determining that a leader replica for the shard will not be moved during this instance of implementing process flow 400.

Operation 408 can comprise determining whether at least one shard for the pair is unlocked (e.g., the unlocked shard can have its leader replica reassigned to the data center of the locked shard). A shard can be locked when, in the current instance of implementing process flow 400, it was examined as part of a pair with a higher correlation value than the current pair, and that examination involved locking the shard. In this manner, shards that have been moved when examined as part of pairs with higher correlation values are kept together, rather than being moved again when examined as part of a pair with a lower correlation value.

Where it is determined in operation 408 that the shards are not locked, process flow 400 moves to operation 408. Instead, where it is determined in operation 408 that the shards are locked, process flow 400 returns to operation 406.

Operation 410 is reached from operation 408 where it is determined that the shards are not locked. Operation 410 generally comprises redistributing the shards of the pair to be in the same data center and locking the shards. Redistributing a shard can comprise changing which copy of a shard is considered to be the leader replica for that shard (without transferring data of that shard between data centers). In some examples, redistributing a shard can be referred to as assigning, reassigning, or moving a shard. This can be, e.g., a logical movement, where which shard is denoted as the leader replica can be changed without copying data of the shard to the new location. In some examples, a list of which shards are leader shards can be maintained by a load balancer (or load distributor) component that receives requests from clients to access the database, and selects a data center to serve the request.

Locking a shard can comprise determining not to change the shard's leader replica again during the current instance of implementing process flow 400.

After operation 410, process flow 400 returns to operation 406.

Operation 412 is reached from operation 406 after the pairs that have a correlation value above a predetermined threshold value have been examined in operations 406-410. Operation 412 generally comprises examining each pair whose correlation value is less than or equal to the predetermined threshold value of operation 406 in descending order of correlation value. A pair can be selected in operation 412, and operations 412-420 can be performed on the pair. When all pairs have been examined, process flow 400 moves to 422, where process flow 400 ends.

Operation 414 generally depicts determining whether one shard of the pair being examined is locked. Where it is determined in operation 414 that the shard is locked, process flow 400 moves to operation 418. Instead, where it is determined that the shard is unlocked, process flow 400 moves to operation 416.

Operation 416 is reached from operation 414 where it is determined that the shard is unlocked. Operation 416 depicts assigning a leader replica for the shard to a data center that contains a fewest number of leader replicas among the data centers of a cluster (e.g., cluster 102 of FIG. 1). In some examples, operation 416 can comprise locking the shard after assigning it to the data center.

After operation 416, process flow 400 moves to operation 418.

Operation 418 is reached from operation 414 where it is determined that the shard is locked, or from operation 416. Operation 418 depicts determining whether the other shard (relative to the shard of operation 414) of the pair is locked.

Where it is determined in operation 418 that the shard is locked, process flow 400 returns to operation 412. Instead, where it is determined that the shard is unlocked, process flow 400 moves to operation 420.

Operation 420 is reached from operation 416 where it is determined that the shard is unlocked. Operation 416 depicts assigning a leader replica for the shard to a data center that contains a fewest number of leader replicas among the data centers of a cluster (e.g., cluster 102 of FIG. 1). In this manner, shards of a pair being examined in operations 412-420 can be assigned to different data centers. For example, in operation 414, the leader replica of the first shard of a pair can be assigned to data center A, which has no other leader replicas. Then, in operation 414, data center A now has one leader replica, and the leader replica of the second shard of the pair can be assigned to data center B, which has no other leader replicas. That is, while operations 406-410 can involve keeping leader replicas of pairs that have a high correlation value together on one data center, operations 412-420 can involve distributing remaining leader replicas across data centers to spread load across the data centers. In some examples, operation 420 can comprise locking the shard after assigning it to the data center.

After operation 420, process flow 400 returns to operation 412.

Example System Architecture

Figure 5:
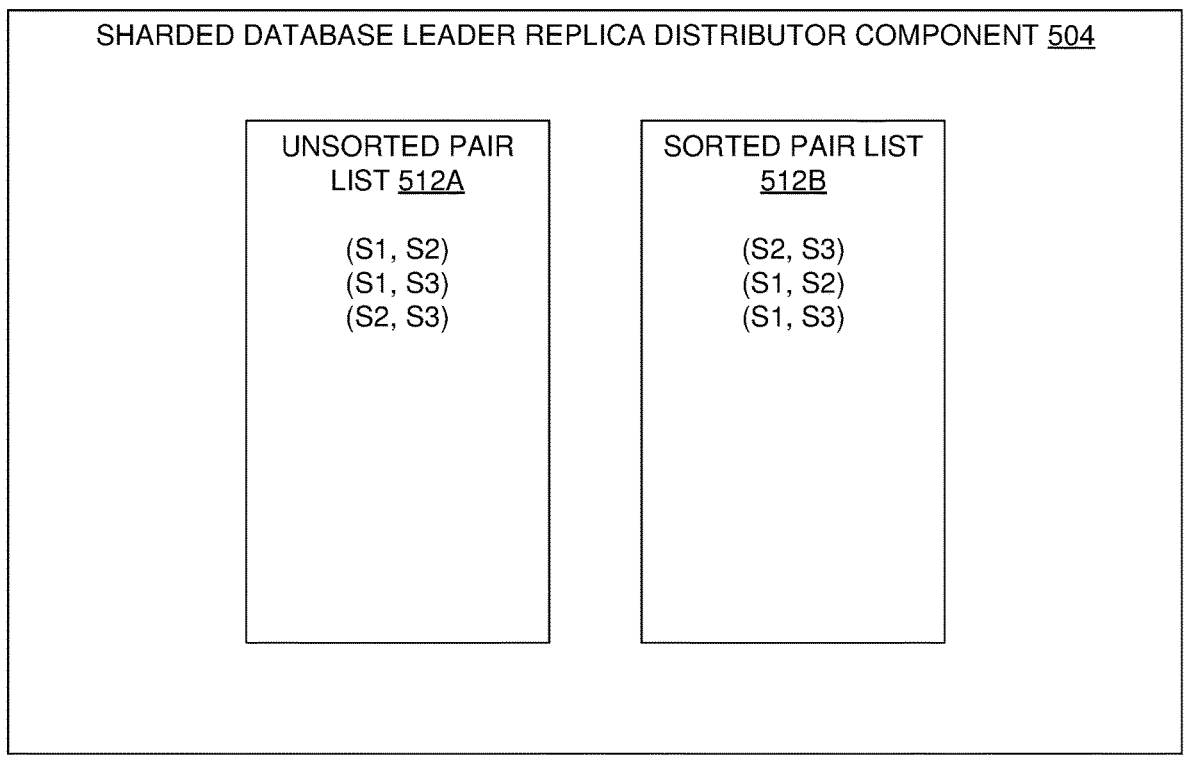
FIG. 5 illustrates an example system architecture for sorting shard pairs that can facilitate a sharded database leader replica distributor, in accordance with an embodiment of this disclosure.

FIG. 5 illustrates an example system architecture 500 for sorting shard pairs that can facilitate a sharded database leader replica distributor, in accordance with an embodiment of this disclosure.

As depicted, system architecture 500 comprises sharded database leader replica distributor component 504 (which can be similar to sharded database leader replica distributor component 104 of FIG. 1). In turn, sharded database leader replica distributor comprises unsorted pair list 512A and sorted pair list 512B.

In some examples, sharded database leader replica distributor component 104 of FIG. 1 can take unsorted pair list 512A and produce from it sorted pair list 512B. This can be performed in a similar manner as described with respect to operation 404 of FIG. 4. Unsorted pair list 512A can comprise an enumeration of pairs of shards stored by cluster 102 of FIG. 1. It can be pairs of shards that are examined because then correlation values can be determined for the respective shards.

Depicted in FIG. 5 is a simplified example involving three shards—S1, S2, and S3. It can be appreciated that there can be examples that involve many more than three shards.

Example Process Flows

FIG. 6 illustrates an example process flow 600 for sorting shard pairs that can facilitate a sharded database leader replica distributor, in accordance with an embodiment of this disclosure. In some examples, one or more embodiments of process flow 600 can be implemented by sharded database leader replica distributor component 104 of FIG. 1, sharded database leader replica distributor component 204 of FIG. 2, sharded database leader replica distributor component 304 of FIG. 3, or computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 400 of FIG. 4, process flow 700 of FIG. 7, process flow 800 of FIG. 8, process flow 900 of FIG. 9, process flow 1000 of FIG. 10, and/or process flow 1100 of FIG. 11.

Process flow 600 begins with operation 602 and moves to operation 604. Operation 604 depicts identifying pairs. This can comprise enumerating possible pairs of shards stored in cluster 102 of FIG. 1.

After operation 604, process flow 600 moves to operation 606.

Operation 606 depicts determining whether there are more pairs. This can comprise, of the identified pairs in operation 604, determining whether each of those pairs has been examined in operation 608 in the present instance of implementing process flow 600.

Where it is determined in operation 606 that there are more pairs, process flow 600 moves to operation 608. Instead, where it is determined in operation 606 that there are not more pairs, process flow 600 moves to operation 610.

Operation 608 is reached from operation 606 where it is determined that there are more pairs. Operation 608 depicts determining a correlation of a pair. This can comprise determining a correlation value such as described with respect to operation 404 of FIG. 4.

After operation 608, process flow 600 returns to operation 606.

Operation 610 is reached from operation 606 where it is determined that there are not more pairs. Operation 610 depicts sorting the pairs based on correlation. This can be performed in a similar manner as described with respect to system architecture 500 of FIG. 5.

After operation 610, process flow 600 moves to 612, where process flow 600 ends.

Figure 7:
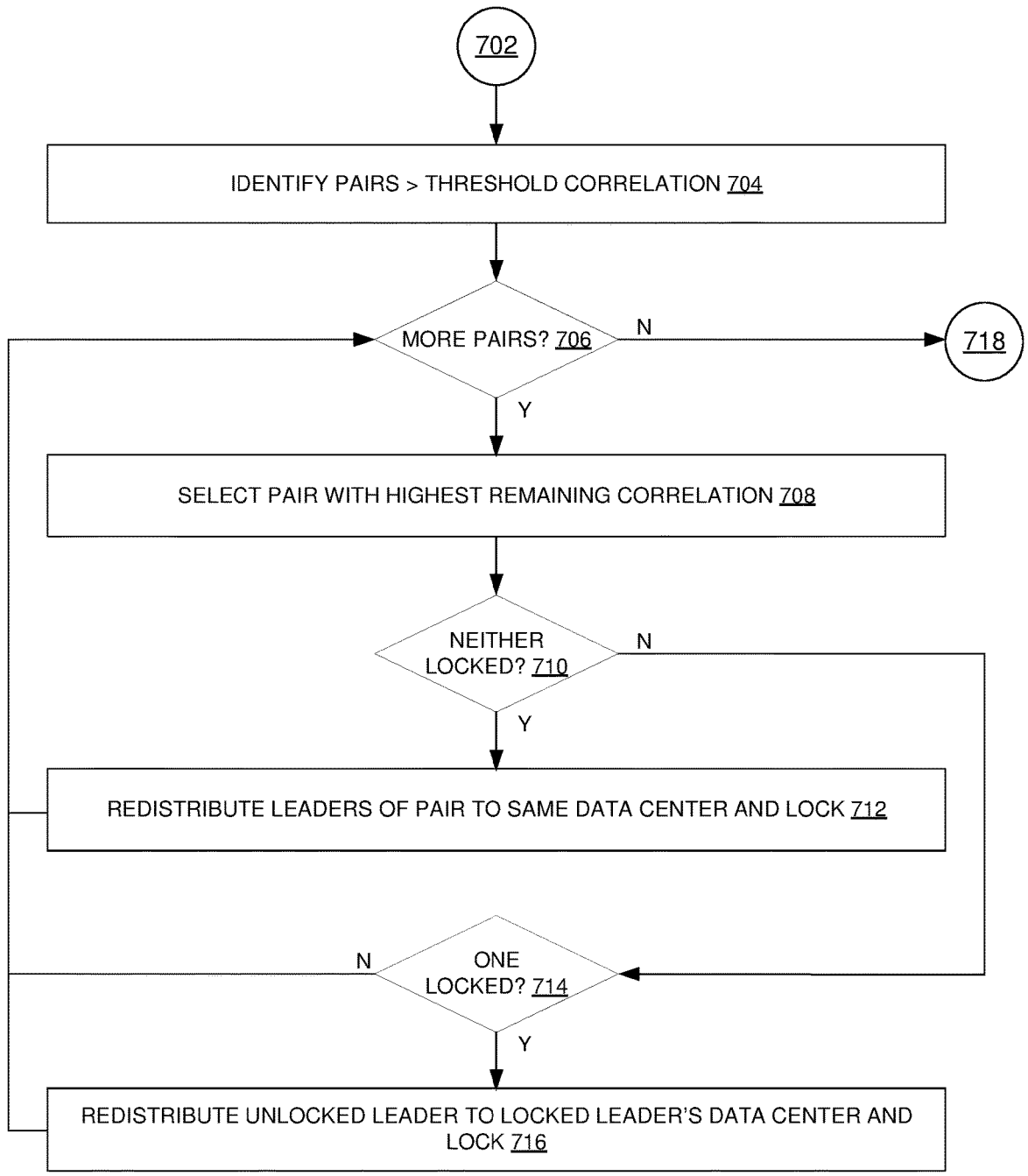
FIG. 7 illustrates an example process flow for redistributing leader replicas in pairs that meet a correlation criterion, and that can facilitate a sharded database leader replica distributor, in accordance with an embodiment of this disclosure.

FIG. 7 illustrates an example process flow 700 for redistributing leader replicas in pairs that meet a correlation criterion, and that can facilitate a sharded database leader replica distributor, in accordance with an embodiment of this disclosure. In some examples, one or more embodiments of process flow 700 can be implemented by sharded database leader replica distributor component 104 of FIG. 1, sharded database leader replica distributor component 204 of FIG. 2, sharded database leader replica distributor component 304 of FIG. 3, or computing environment 1200 of FIG. 12.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 600 of FIG. 6, process flow 800 of FIG. 8, process flow 900 of FIG. 9, process flow 1000 of FIG. 10, and/or process flow 1100 of FIG. 11.

Process flow 700 begins with operation 702 and moves to operation 704. Operation 704 depicts identifying pairs that have a correlation above a threshold correlation. In some examples, operation 704 can be implemented in a similar manner as operation 406 of FIG. 4.

After operation 704, process flow 700 moves to operation 706.

Operation 706 is reached from operation 704, from operation 712, from operation 714 where it is determined that both shards of the pair are locked, or from operation 716. Operation 706 depicts determining whether there are more pairs. This can involve determining whether there are more pairs to examine in the current instance of implementing process flow 700 from those pairs identified in operation 704.

Where it is determined in operation 706 that there are more pairs, process flow 700 moves to operation 708. Instead, where it is determined in operation 706 that there are not more pairs, process flow 700 moves to 718, where process flow 700 ends.

Operation 708 is reached from operation 706 where it is determined that there are more pairs. Operation 708 depicts selecting a pair with a highest remaining correlation. This can be the correlation value determined in operation 608 of FIG. 6.

After operation 708, process flow 700 moves to operation 710.

Operation 710 depicts determining whether neither shard of the pair is locked.

Where it is determined in operation 710 that neither shard from the pair is locked, process flow 700 moves to operation 712. Instead, where it is determined in operation 710 that at least one shard from the pair is locked, process flow 700 moves to operation 714.

Operation 712 is reached from operation 710 where it is determined that neither shard from the pair is locked. Operation 712 depicts redistributing leaders of the pair to the same data center, and locking the shards of the pair. In some examples, this can comprise redistributing the leader replicas to one of the leader replica's present data center. In other examples, this can comprise redistributing both leader replicas to a new data center.

In some examples where neither leader of the pair is locked, the leaders can be assigned to a data center of the data centers that has the fewest leader replicas. In other examples where neither leader is locked, the leaders can be assigned to a data center that has fewer than a threshold number of leader replicas (such as measured as a percentage of the lowest number of leader replicas of any data center in the cluster).

After operation 712, process flow 700 returns to operation 706.

Operation 714 is reached from operation 710 where it is determined that at least one shard from the pair is locked. Operation 714 depicts determining whether one shard from the pair is locked. This can involve determining whether exactly one of the two shards is locked. That is, it can have already been determined in operation 710 that at least one shard is locked. So, operation 714 can comprise determining whether it is the case that exactly one shard is locked, or that both shards are locked.

Where it is determined in operation 714 that one shard from the pair is locked, process flow 700 moves to operation 716. Instead, where it is determined in operation 714 that both shards from the pair are locked, process flow 700 returns to operation 706.

Operation 716 is reached from operation 714 where it is determined that one shard from the pair is locked. Operation 716 depicts redistributing the unlocked leader to the locked leader's replica, and locking the unlocked leader. That is, where there is a pair with a correlation value above a predetermined threshold value (so shards of the pair will be located on the same data center, where not both shards are locked), and one shard is locked, the other leader replica can be assigned to the locked shard's data center.

After operation 716, process flow 700 returns to operation 706.

Figure 8:
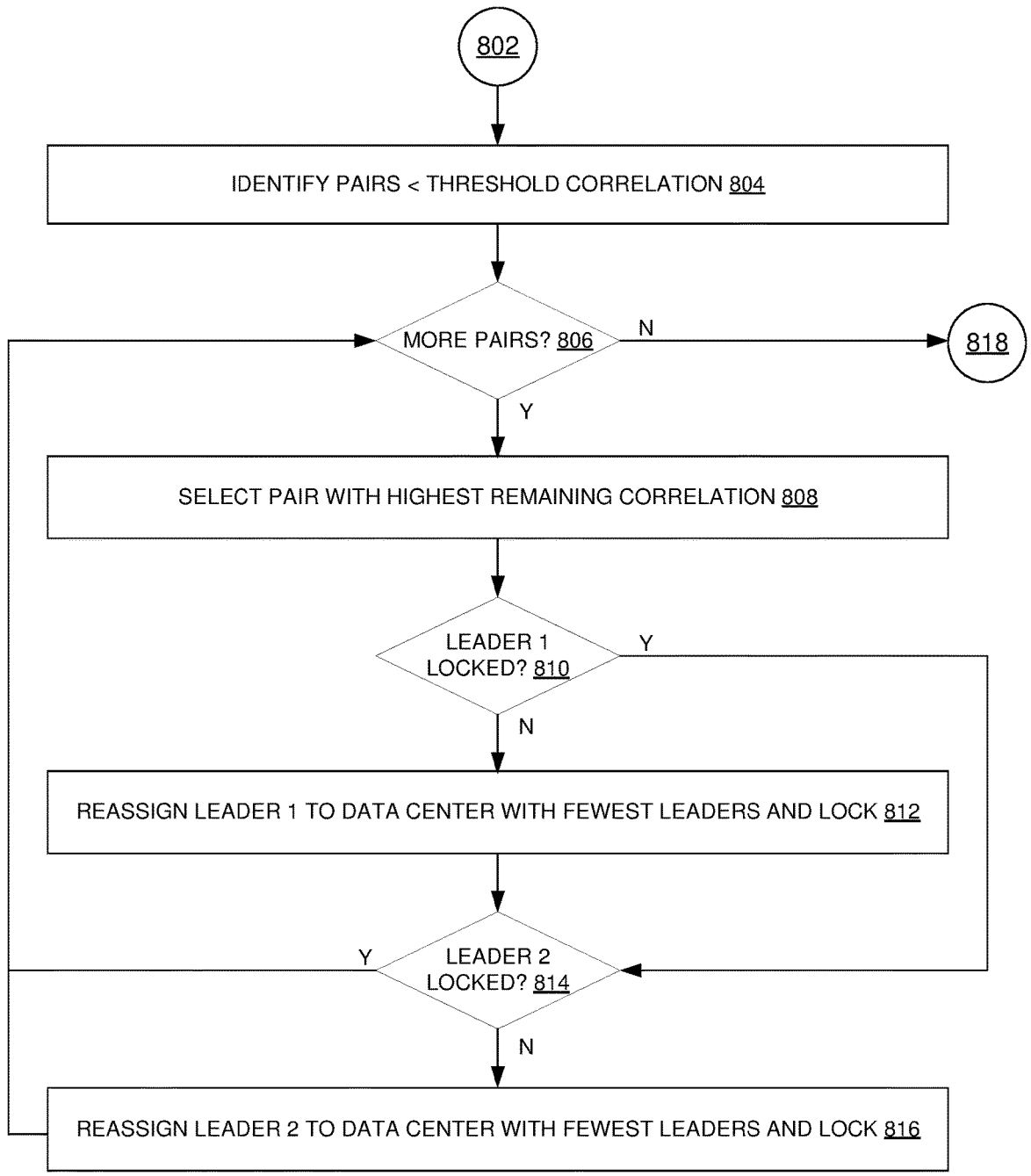
FIG. 8 illustrates an example process flow for redistributing leader replicas in pairs that do not meet a correlation criterion, and that can facilitate a sharded database leader replica distributor, in accordance with an embodiment of this disclosure.

FIG. 8 illustrates an example process flow 800 for redistributing leader replicas in pairs that do not meet a correlation criterion, and that can facilitate a sharded database leader replica distributor, in accordance with an embodiment of this disclosure. In some examples, one or more embodiments of process flow 800 can be implemented by sharded database leader replica distributor component 104 of FIG. 1, sharded database leader replica distributor component 204 of FIG. 2, sharded database leader replica distributor component 304 of FIG. 3, or computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 600 of FIG. 6, process flow 700 of FIG. 7, process flow 900 of FIG. 9, process flow 1000 of FIG. 10, and/or process flow 1100 of FIG. 11.

Process flow 800 begins with operation 802 and moves to operation 804. Operation 804 depicts identifying pairs that have a correlation below a threshold correlation. These can be the pairs described with respect to operation 412 of FIG. 4.

After operation 804, process flow 800 moves to operation 806.

Operation 806 is reached from operation 804, from operation 814 where it is determined that leader 2 is locked, or from operation 816. Operation 806 depicts determining whether there are more pairs. In some examples, operation 806 can be implemented in a similar manner as operation 706 of FIG. 7, for the pairs identified in operation 804.

Where it is determined in operation 806 that there are more pairs, process flow 800 moves to operation 808. Instead, where it is determined in operation 806 that there are not more pairs, process flow 800 moves to 818, where process flow 800 ends.

Operation 808 is reached from operation 806 where it is determined that there are more pairs. Operation 808 depicts selecting a pair with a highest remaining correlation. In some examples, operation 808 can be implemented in a similar manner as operation 708 of FIG. 7, for the pairs identified in operation 804.

After operation 808, process flow 800 moves to operation 810.

Operation 810 depicts determining whether leader 1 is locked. Leader 1 can be a shard of the pair selected in operation 808.

Where it is determined in operation 810 that leader 1 is locked, process flow 800 moves to operation 814. Instead, where it is determined in operation 810 that leader 1 is unlocked, process flow 800 moves to operation 812.

Operation 812 is reached from operation 810 where it is determined that leader 1 is locked. Operation 812 depicts redistributing leader 1 to a data center with the fewest leaders and locking leader 1. In some examples, operation 812 can be implemented in a similar manner as operation 416 of FIG. 4.

After operation 812, process flow 800 moves to operation 814.

Operation 814 depicts determining whether leader 2 is locked. Leader 2 can be a second shard of the pair of shards selected in operation 808 (relative to leader 1 in operation 810).

Where it is determined in operation 814 that leader 2 is locked, process flow 800 returns to operation 806. Instead, where it is determined in operation 814 that leader 2 is unlocked, process flow 800 moves to operation 816.

Operation 816 is reached from operation 814 where it is determined that leader 2 is locked. Operation 816 depicts redistributing leader 2 to a data center with the fewest leaders and locking leader 2. In some examples, operation 816 can be implemented in a similar manner as operation 420 of FIG. 4.

After operation 816, process flow 800 returns to operation 806.

FIG. 9 illustrates an example process flow 900 for facilitating a sharded database leader replica distributor, in accordance with an embodiment of this disclosure. In some examples, one or more embodiments of process flow 900 can be implemented by sharded database leader replica distributor component 104 of FIG. 1, sharded database leader replica distributor component 204 of FIG. 2, sharded database leader replica distributor component 304 of FIG. 3, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 600 of FIG. 6, process flow 700 of FIG. 7, process flow 800 of FIG. 8, process flow 1000 of FIG. 10, and/or process flow 1100 of FIG. 11.

Process flow 900 begins with operation 902 and moves to operation 904. Operation 904 comprises dividing a database into a group of shards that are distributed among a group of data centers, wherein the group of shards comprises respective leader replicas.

In some examples, there are multiple replicas of a first shard of the group of shards, wherein a first replica of the multiple replicas is a first leader replica, wherein the first leader replica processes write operations on behalf of the multiple replicas, and wherein the multiple replicas are configured to process read operations. In some examples, operation 904 can be implemented in a similar manner as operation 404 of FIG. 4.

After operation 904, process flow 900 moves to operation 906.

Operation 906 comprises determining respective correlation values between pairs of shards of the group of shards. In some examples, operation 906 can be implemented in a similar manner as operation 404 of FIG. 4 as applied to determining correlation values.

In some examples, operation 906 comprises enumerating pairs of shards of the group of shards into an enumerated group of unsorted shards. In some examples, operation 906 comprises determining the respective correlation values between pairs of shards of the enumerated group of unsorted shards to produce an unsorted group of correlation values. In some examples, operation 906 comprises sorting the unsorted group of correlation values to produce a sorted group of correlation values, and examining the pairs of shards of the sorted group of correlation values in the descending order of respective correlations values. That is, possible pairs of shards can be enumerated, and correlation values be determined for each of these pairs. Then, the pairs can be sorted in a descending order of corresponding correlation values.

After operation 906, process flow 900 moves to operation 908.

Operation 908 comprises examining the pairs of shards in a descending order of respective correlation values. In some examples, operation 908 can be implemented in a similar manner as operations 406 and 412 of FIG. 4.

After operation 908, process flow 900 moves to 914, where process flow 900 ends.

Operation 910 comprises, in response to determining that a respective pair of shards of the pairs of shards has a first correlation value that is greater than a predetermined threshold value, and that at least one shard of the respective pair of shards is unlocked, reassigning leader replicas of the respective pair of shards to be stored in a same data center of the group of data centers. That is, in some examples, operation 910 can be implemented in a similar manner as operations 406-410 of FIG. 4.

In some examples, the first correlation value comprises a Pearson correlation.

After operation 910, process flow 900 moves to operation 912.

Figure 10:
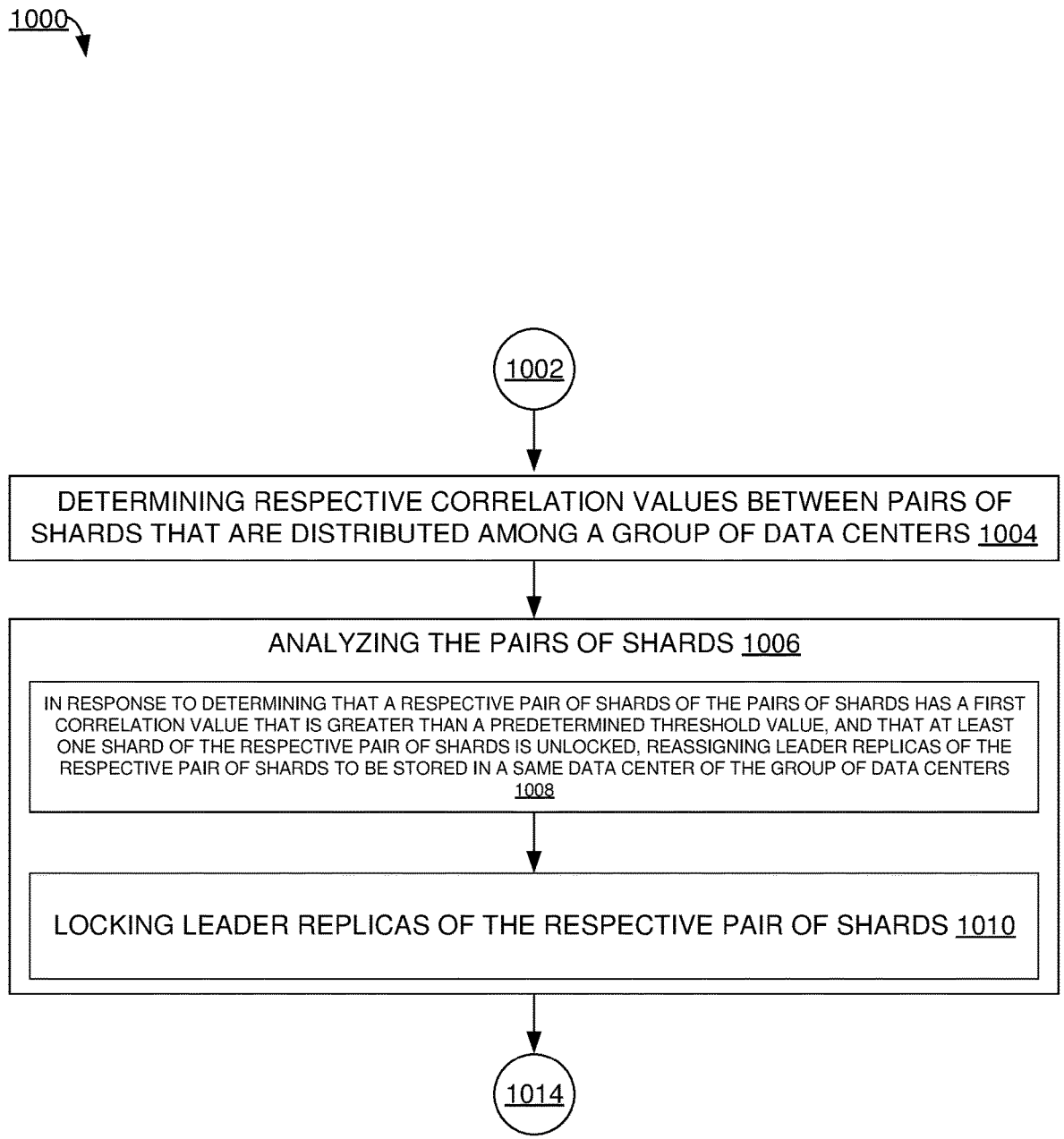
FIG. 10 illustrates another example process flow a sharded database leader replica distributor, in accordance with an embodiment of this disclosure.

Operation 912 comprises locking the leader replicas of the respective pair of shards from being reassigned to another data center of the group of data centers during the examining In some examples, operation 912 can be implemented in a similar manner as operation 410 of FIG. 10 as applied to locking shards.

In some examples, operation 912 comprises, in response to determining that a second respective pair of shards of the pairs of shards has a second correlation value that is less than or equal to the predetermined threshold value, and that a first shard of the second respective pair of shards is unlocked, reassigning a leader replica of the first shard to a first data center of the group of data centers that stores a lowest number of leader replicas, and locking the first shard. In some examples, operation 912 comprises in response to determining that a second shard of the second respective pair of shards is unlocked, reassigning a leader replica of the second shard to a second data center of the group of data centers that stores a lowest number of leader replicas, and locking the second shard. That is, in some examples, operation 912 can incorporate operations 412-420 of FIG. 4 to process pairs that have a correlation value that is less than or equal to the predetermined threshold value.

After operation 912, process flow 900 moves to another iteration of operation 908.

FIG. 10 illustrates another example process flow 1000 for facilitating a sharded database leader replica distributor, in accordance with an embodiment of this disclosure. In some examples, one or more embodiments of process flow 1000 can be implemented by sharded database leader replica distributor component 104 of FIG. 1, sharded database leader replica distributor component 204 of FIG. 2, sharded database leader replica distributor component 304 of FIG. 3, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 400 of FIG. 4, process flow 600 of FIG. 6, process flow 700 of FIG. 7, process flow 800 of FIG. 8, process flow 900 of FIG. 9, and/or process flow 1100 of FIG. 11.

Process flow 1000 begins with operation 1002 and moves to operation 1004. Operation 1004 depicts determining respective correlation values between pairs of shards that are distributed among a group of data centers. In some examples, operation 1004 can be implemented in a similar manner as operation 904 of FIG. 9.

After operation 1004, process flow 1000 moves to operation 1006.

Operation 1006 depicts analyzing the pairs of shards. In some examples, operation 1006 can be implemented in a similar manner as operation 908 of FIG. 9.

In some examples, operation 1006 comprises analyzing the pairs of shards in a descending order of respective correlation values.

After operation 1006, process flow 1000 moves to 1012, where process flow 1000 ends.

Operation 1008 depicts, in response to determining that a respective pair of shards of the pairs of shards has a first correlation value that is greater than a predetermined threshold value, and that at least one shard of the respective pair of shards is unlocked, reassigning leader replicas of the respective pair of shards to be stored in a same data center of the group of data centers. In some examples, operation 1008 can be implemented in a similar manner as operation 910 of FIG. 9.

In some examples, the first correlation value is a measure of a linear correlation between shards of the respective pair of shards.

After operation 1008, process flow 1000 moves to operation 1010.

Operation 1010 depicts locking leader replicas of the respective pair of shards. In some examples, operation 1010 can be implemented in a similar manner as operation 912 of FIG. 9.

In some examples, locking the leader replicas comprises locking the leader replicas of the respective pair of shards from being reassigned to another data center of the group of data centers during the analyzing.

In some examples, operation 1010 comprises, in response to determining that a second respective pair of shards of the pairs of shards has a second correlation value that is less than or equal to the predetermined threshold value, and that a first shard of the second respective pair of shards is unlocked, reassigning a leader replica of the first shard to a first data center of the group of data centers that stores a lowest number of leader replicas, and locking the first shard. In some examples, operation 1010 comprises in response to determining that a second shard of the second respective pair of shards is unlocked, reassigning a leader replica of the second shard to a second data center of the group of data centers that stores a lowest number of leader replicas, and locking the second shard. That is, in some examples, operation 1010 can incorporate operations 412-420 of FIG. 4 to process pairs that have a correlation value that is less than or equal to the predetermined threshold value.

After operation 1010, process flow 1000 returns to another iteration of operation 1006.

Figure 11:
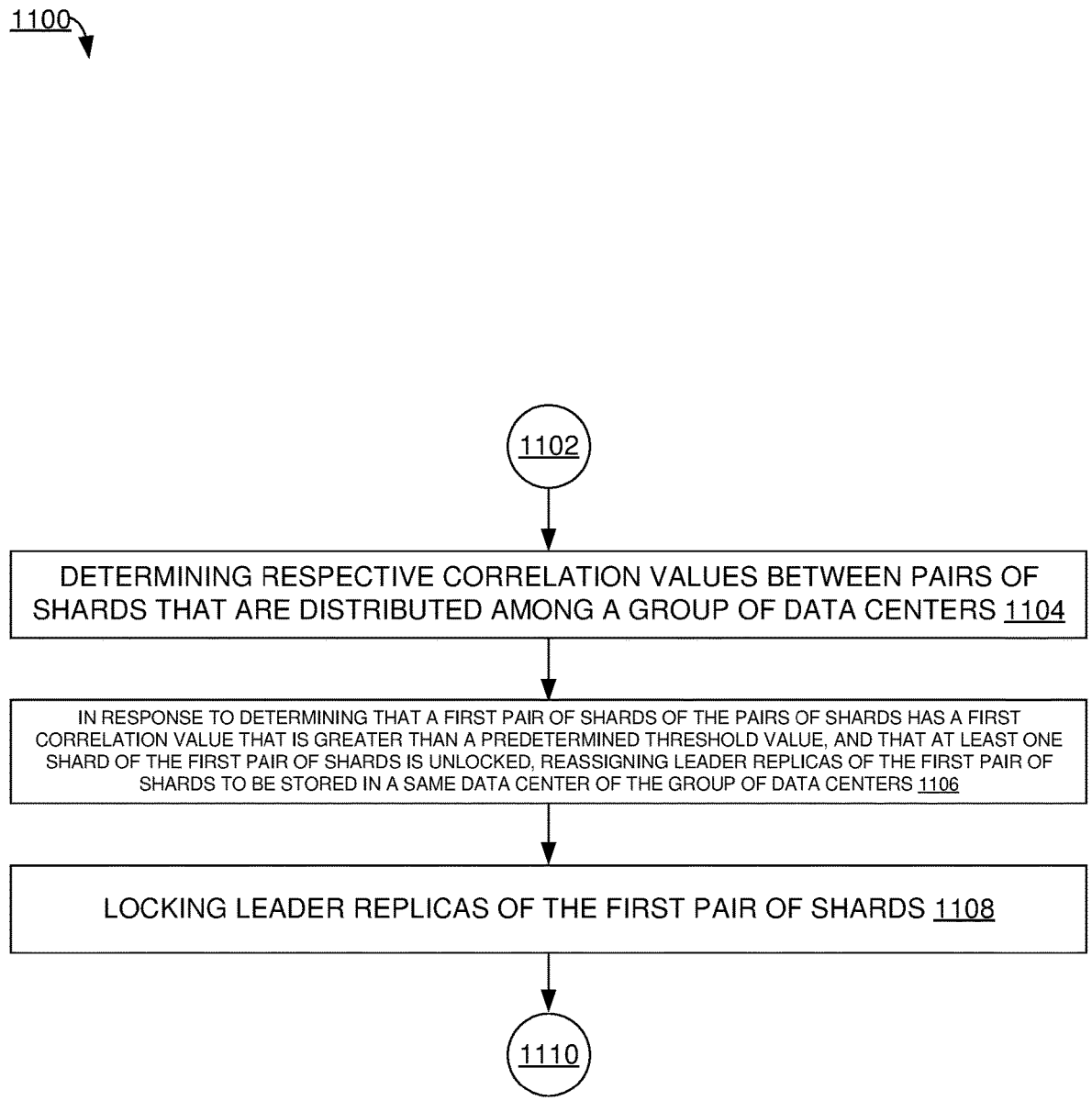
FIG. 11 illustrates another example process flow a sharded database leader replica distributor, in accordance with an embodiment of this disclosure.

FIG. 11 illustrates another example process flow 1100 for facilitating a sharded database leader replica distributor, in accordance with an embodiment of this disclosure. In some examples, one or more embodiments of process flow 1100 can be implemented by sharded database leader replica distributor component 104 of FIG. 1, sharded database leader replica distributor component 204 of FIG. 2, sharded database leader replica distributor component 304 of FIG. 3, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 400 of FIG. 4, process flow 600 of FIG. 6, process flow 700 of FIG. 7, process flow 800 of FIG. 8, process flow 900 of FIG. 9, and/or process flow 1000 of FIG. 10.

Process flow 1100 begins with operation 1102 and moves to operation 1component 104. Operation 1component 104 depicts determining respective correlation values between pairs of shards that are distributed among a group of data centers. In some examples, operation 1component 104 can be implemented in a similar manner as operation 906 of FIG. 9.

After operation 1component 104, process flow 1100 moves to operation 1106.

Operation 1106 depicts, in response to determining that a first pair of shards of the pairs of shards has a first correlation value that is greater than a predetermined threshold value, and that at least one shard of the first pair of shards is unlocked, reassigning leader replicas of the first pair of shards to be stored in a same data center of the group of data centers. In some examples, operation 1106 can be implemented in a similar manner as operation 910 of FIG. 9.

In some examples, operation 1106 comprises performing iterations of analyzing respective pairs of shards of the pairs of shards, the iterations comprising reassigning leader replicas of the respective pairs of shards, and locking leader replicas of the respective pairs of shards. In some examples, the analyzing comprises analyzing the pairs of shards in a descending order of respective correlation values. That is, each pair of shards can be examined in descending order of correlation value, and possibly have one or both leader replicas reassigned to a new data center, and have one or both leader replicas locked.

In some examples, the first correlation value is a measure of likelihood that, when a leader replica of a first shard of the respective pair of shards is accessed as part of processing a request, then a leader replica of a second shard of the respective pair of shards is accessed as part of processing the request.

After operation 1106, process flow 1100 moves to operation 1108.

Operation 1108 depicts locking leader replicas of the first pair of shards. In some examples, operation 1108 can be implemented in a similar manner as operation 912 of FIG. 9.

In some examples, operation 1108 comprises, in response to determining that a second pair of shards of the pairs of shards has a second correlation value that is less than or equal to the predetermined threshold value, and that a first shard of the second pair of shards is unlocked, reassigning a leader replica of the first shard to a first data center of the group of data centers that stores a lowest number of leader replicas, and locking the first shard. In some examples, operation 1108 comprises in response to determining that a second shard of the second respective pair of shards is unlocked, reassigning a leader replica of the second shard to a second data center of the group of data centers that stores a lowest number of leader replicas, and locking the second shard. That is, in some examples, operation 1108 can incorporate operations 412-420 of FIG. 4 to process pairs that have a correlation value that is less than or equal to the predetermined threshold value.

After operation 1108, process flow 1100 moves to 1108, where process flow 1000 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of cluster 102, sharded database leader replica distributor component 104, sharded database servers 106, client computer 108, and/or data centers 112 of FIG. 1

In some examples, computing environment 1200 can implement one or more embodiments of the process flows of FIGS. 4 and/or 6-12 to facilitate a sharded database leader replica distributor.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1component 204, a system memory 1206 and a system bus 1208. The system bus 1208 couples system components including, but not limited to, the system memory 1206 to the processing unit 1component 204. The processing unit 1component 204 can be any of various commercially available processors. Dual microprocessors and other multi-processor architectures can also be employed as the processing unit 1component 204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1component 204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples, and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
dividing a database into a group of shards that are distributed among a group of data centers, wherein the group of shards comprises respective leader replica shards wherein the respective leader replica shards are respective copies of at least one respective non-leader copy shard, and wherein the respective leader replica shards process write operations for the respective copies of the at least one respective non-leader copy shard;
determining respective correlation values between respective pairs of shards of the group of shards, wherein the respective correlation values indicate a correlation of whether both shards of the respective pairs of shards are involved in processing individual requests of the respective requests; and
examining the pairs of shards in a descending order of the respective correlation values, comprising:
in response to determining that a respective pair of shards of the pairs of shards has a first correlation value that is greater than a predetermined threshold value, and that at least one shard of the respective pair of shards is unlocked from having a leader replica status associated with the at least one shard changed to a shard in another data center of the group of data centers, reassigning at least one leader replica status of the respective pair of shards to a respective copy of the at least one respective non-leader copy shard, wherein, after the reassigning, the respective leader replica shards of the respective pair of shards are stored in a same data center of the group of data centers; and locking the leader replicas of the respective pair of shards from being reassigned to another data center of the group of data centers during the examining.

2. The system of claim 1, wherein the respective pair of shards is a first respective pair of shards, and wherein the operations further comprise:
in response to determining that a second respective pair of shards of the pairs of shards has a second correlation value that is less than or equal to the predetermined threshold value, and that a first shard of the second respective pair of shards is unlocked, reassigning a leader replica shard of the first shard to a first data center of the group of data centers that stores a lowest number of leader replica shards, and locking the first shard.

3. The system of claim 2, wherein the operations further comprise:
in response to determining that a second shard of the second respective pair of shards is unlocked, reassigning a leader replica shard of the second shard to a second data center of the group of data centers that stores a lowest number of leader replica shards, and locking the second shard.

4. The system of claim 1, wherein the operations further comprise:
determining not to reassign a location of a locked leader replica shard during the examining.

5. The system of claim 1, wherein there are multiple replicas of a first shard of the group of shards, wherein a first replica of the multiple replicas is a first leader replica shard, wherein the first leader replica processes write operations on behalf of the multiple replicas, and wherein the multiple replicas are configured to process read operations.

6. The system of claim 1, wherein the operations further comprise:
enumerating pairs of shards of the group of shards into an enumerated group of unsorted shards.

7. The system of claim 6, wherein the operations further comprise:
determining the respective correlation values between pairs of shards of the enumerated group of unsorted shards to produce an unsorted group of correlation values.

8. The system of claim 7, wherein the operations further comprise:
sorting the unsorted group of correlation values to produce a sorted group of correlation values; and
examining the pairs of shards of the sorted group of correlation values in the descending order of respective correlations values.

9. A method, comprising:
determining, by a system comprising a processor, respective correlation values between pairs of shards that are distributed among a group of data centers; and
analyzing, by the system, the pairs of shards, comprising:
in response to determining that a respective pair of shards of the pairs of shards has a first correlation value that is greater than a predetermined threshold value, wherein the first correlation value indicates a measure of correlation of whether both shards of the respective pair of shards are involved in processing individual requests to access the shards, and that at least one shard of the respective pair of shards is unlocked, reassigning leader replicas of the respective pair of shards to be stored in a same data center of the group of data centers; and
locking leader replicas of the respective pair of shards.

10. The method of claim 9, wherein the respective pair of shards is a first respective pair of shards, and further comprising:
in response to determining that a second respective pair of shards of the pairs of shards has a second correlation value that is less than or equal to the predetermined threshold value, and that a first shard of the second respective pair of shards is unlocked, reassigning, by the system, a leader replica of the first shard to a first data center of the group of data centers that stores a lowest number of leader replicas, and locking the first shard.

11. The method of claim 10, further comprising:
in response to determining that a second shard of the second respective pair of shards is unlocked, reassigning, by the system, a leader replica of the second shard to a second data center of the group of data centers that stores a lowest number of leader replicas, and locking the second shard.

12. The method of claim 9, wherein the analyzing comprises:
analyzing the pairs of shards in a descending order of respective correlation values.

13. The method of claim 9, wherein the locking the leader replicas comprises:
locking the leader replicas of the respective pair of shards from being reassigned to another data center of the group of data centers during the analyzing.

14. The method of claim 9, wherein the first correlation value is a measure of a linear correlation between shards of the respective pair of shards.

15. A non-transitory computer-readable medium comprising instructions that, in response to execution, cause a system comprising a processor to perform operations, comprising:
determining respective correlation values between pairs of shards that are distributed among a group of data centers;
in response to determining that a first pair of shards of the pairs of shards has a first correlation value that is greater than a predetermined threshold value, wherein the first correlation value indicates how often both shards of the respective pair of shards are utilized to process respective requests to the shards, and that at least one shard of the first pair of shards is unlocked, reassigning leader replicas of the first pair of shards to be stored in a same data center of the group of data centers; and
locking leader replicas of the first pair of shards.

16. The non-transitory computer-readable medium of claim 15, wherein the operations comprise:
performing iterations of analyzing respective pairs of shards of the pairs of shards, the iterations comprising reassigning leader replicas of the respective pairs of shards, and locking leader replicas of the respective pairs of shards.

17. The non-transitory computer-readable medium of claim 16, wherein the analyzing comprises:
analyzing the pairs of shards in a descending order of respective correlation values.

18. The non-transitory computer-readable medium of claim 15, wherein the first correlation value is a measure of likelihood that, when a leader replica of a first shard of the respective pair of shards is accessed as part of processing a request, then a leader replica of a second shard of the respective pair of shards is accessed as part of processing the request.

19. The non-transitory computer-readable medium of claim 15, further comprising:
   in response to determining that a second pair of shards of the pairs of shards has a second correlation value that is less than or equal to the predetermined threshold value, and that a first shard of the second pair of shards is unlocked, reassigning a leader replica of the first shard to a first data center of the group of data centers that stores a lowest number of leader replicas, and locking the first shard.

20. The non-transitory computer-readable medium of claim 19, wherein the operations further comprise:
   in response to determining that a second shard of the second respective pair of shards is unlocked, reassigning a leader replica of the second shard to a second data center of the group of data centers that stores a lowest number of leader replicas, and locking the second shard.

* * * * *